United States Patent
Sheridan

(10) Patent No.: US 10,436,055 B2
(45) Date of Patent: Oct. 8, 2019

(54) DISTRIBUTED FAN LUBRICATION SYSTEM

(71) Applicant: United Technologies Corporation, Farmington, CT (US)

(72) Inventor: William G. Sheridan, Southington, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 15/386,054

(22) Filed: Dec. 21, 2016

(65) Prior Publication Data
US 2018/0355749 A1    Dec. 13, 2018

(51) Int. Cl.
| | | |
|---|---|---|
| F01D 13/00 | (2006.01) | |
| F02C 3/107 | (2006.01) | |
| F02K 3/04 | (2006.01) | |
| F01D 25/20 | (2006.01) | |
| F02C 7/36 | (2006.01) | |
| F02C 6/00 | (2006.01) | |
| F02K 3/077 | (2006.01) | |

(52) U.S. Cl.
CPC ......... *F01D 13/003* (2013.01); *F01D 25/20* (2013.01); *F02C 3/107* (2013.01); *F02C 7/36* (2013.01); *F02K 3/04* (2013.01); *F02K 3/077* (2013.01); *F02C 6/00* (2013.01); *F05D 2220/323* (2013.01); *F05D 2220/36* (2013.01); *F05D 2260/4031* (2013.01); *F05D 2260/98* (2013.01)

(58) Field of Classification Search
CPC ........ F01D 9/065; F01D 13/003; F01D 25/18; F01D 25/20; F16N 2210/02; F02K 3/077
See application file for complete search history.

(56) References Cited

U.S. PATENT DOCUMENTS

| | | | |
|---|---|---|---|
| 4,077,206 A | 3/1978 | Ayyagari | |
| 5,943,856 A | 8/1999 | Lillibridge et al. | |
| 6,182,787 B1 | 2/2001 | Kraft et al. | |
| 6,527,224 B2 | 3/2003 | Seidel | |
| 7,337,875 B2 | 3/2008 | Proscia et al. | |
| 7,540,354 B2 | 6/2009 | Morin et al. | |
| 7,874,142 B2 | 1/2011 | Beardsley | |
| 8,307,626 B2 | 11/2012 | Sheridan | |
| 2006/0011780 A1 | 1/2006 | Brand et al. | |
| 2006/0054406 A1* | 3/2006 | Delaloye | F01D 25/18 184/6.11 |
| 2007/0034446 A1 | 2/2007 | Proscia et al. | |
| 2007/0251212 A1 | 11/2007 | Tester | |
| 2008/0112796 A1 | 5/2008 | Coney et al. | |
| 2008/0121376 A1* | 5/2008 | Schwarz | F01D 15/10 165/104.28 |

(Continued)

OTHER PUBLICATIONS

European Search Report for EP Application No. 17209157.1 dated May 23, 2018.

*Primary Examiner* — Arun Goyal
*Assistant Examiner* — Colin J Paulauskas
(74) *Attorney, Agent, or Firm* — Carlson, Gaskey & Olds, P.C.

(57) ABSTRACT

A propulsion system for an aircraft comprises a gas generator including a turbine driving a main drive shaft, the main drive shaft, in turn, driving at least two fan drive shafts, wherein the at least two fan drive shafts are driven on non-coaxial axes, the fan drive shaft each driving a fan rotor through a fan drive system. A fan lubrication system provides lubrication to each of the fan drive systems.

16 Claims, 3 Drawing Sheets

(56) References Cited

U.S. PATENT DOCUMENTS

| | | | |
|---|---|---|---|
| 2009/0191047 A1 | 7/2009 | Schlinker et al. | |
| 2009/0235630 A1* | 9/2009 | Norris | F01D 25/20 60/39.08 |
| 2015/0226117 A1 | 8/2015 | Suciu et al. | |
| 2016/0076444 A1 | 3/2016 | Bailey Noval et al. | |
| 2016/0131044 A1 | 5/2016 | Suciu et al. | |
| 2017/0292531 A1* | 10/2017 | Snyder | F04D 29/542 |

* cited by examiner

DISTRIBUTED FAN LUBRICATION SYSTEM

BACKGROUND OF THE INVENTION

This application relates to an aircraft propulsion system utilizing non-coaxial fans and wherein each of the fans is provided with its own lubrication system.

Gas turbine engines are typically utilized as propulsion for aircraft applications. Historically, a gas turbine engine had a fan, compressor, and turbine all mounted coaxially. More modern aircraft proposals require more flexibility in the way of propulsion systems.

In one proposed aircraft, there are a plurality of distributed fans to provide propulsion air at spaced locations on an aircraft fuselage. A single gas generator gas turbine engine drives the distributed fans.

SUMMARY OF THE INVENTION

In a featured embodiment, a propulsion system for an aircraft comprises a gas generator including a turbine driving a main drive shaft, the main drive shaft, in turn, driving at least two fan drive shafts, wherein the at least two fan drive shafts are driven on non-coaxial axes, the fan drive shaft each driving a fan rotor through a fan drive system. A fan lubrication system provides lubrication to each of the fan drive systems.

In another embodiment according to the previous embodiment, the fan drive shafts are positioned on opposed sides of a drive axis of the turbine.

In another embodiment according to any of the previous embodiments, a main lubrication system pump is driven by the gas generator and delivers lubricant to each of the fan lubrication systems.

In another embodiment according to any of the previous embodiments, a delivery line to each of the fan drive systems has a shutoff valve such that lubricant can be stopped to the fan lubrication systems should a failure be detected.

In another embodiment according to any of the previous embodiments, each of the fan lubrication systems includes an oil tank.

In another embodiment according to any of the previous embodiments, each of the fan lubrication systems includes a heat exchanger and air from each of the fan rotor passing over the heat exchanger to cool the lubricant.

In another embodiment according to any of the previous embodiments, a pressure sensor senses a pressure on a lubricant line associated with each of the fan drive systems to detect a failure.

In another embodiment according to any of the previous embodiments, each of the independent fan lubrication systems includes an oil filter.

In another embodiment according to any of the previous embodiments, each of the fan lubrication systems includes a fan drive system lubricant pump driven by a gear associated with each of the fan drive systems.

In another embodiment according to any of the previous embodiments, a return line returns a portion of lubricant from the fan drive system lubricant pump back to the oil tank.

In another embodiment according to any of the previous embodiments, an air vent is associated with each of the system oil tanks.

In another embodiment according to any of the previous embodiments, a portion of the oil delivered by the fan drive system lubricant pump is delivered to the fan drive system and a portion of the lubricant is returned to the main lubricant supply system.

In another embodiment according to any of the previous embodiments, a pressure is sensed on a line including the portion of the lubricant being returned to the main lubricant system and the pressure being utilized to detect a failure of either of the at least two fan drive systems.

In another embodiment according to any of the previous embodiments, the fan lubrication systems are completely independent.

In another embodiment according to any of the previous embodiments, a delivery line to each of the fan drive systems has a shutoff valve such that lubricant can be stopped to the fan lubrication systems should a failure be detected.

In another embodiment according to any of the previous embodiments, each of the fan lubrication systems includes a fan drive system lubricant pump driven by a gear associated with each of the fan drive systems.

In another embodiment according to any of the previous embodiments, each of the fan lubrication systems includes an oil tank.

In another embodiment according to any of the previous embodiments, a return line returns a portion of lubricant from the fan drive system lubricant pump back to the oil tank.

In another embodiment according to any of the previous embodiments, a portion of the oil delivered by the fan drive system lubricant pump is delivered to the fan drive system and a portion of the lubricant is returned to the main lubricant supply system.

In another embodiment according to any of the previous embodiments, a pressure is sensed on a line including the portion of the lubricant being returned to the main lubricant system and the pressure being utilized to detect a failure of either of the at least two fan drive systems.

These and other features may be best understood from the following drawings and specification.

DETAILED DESCRIPTION

Figure 1:
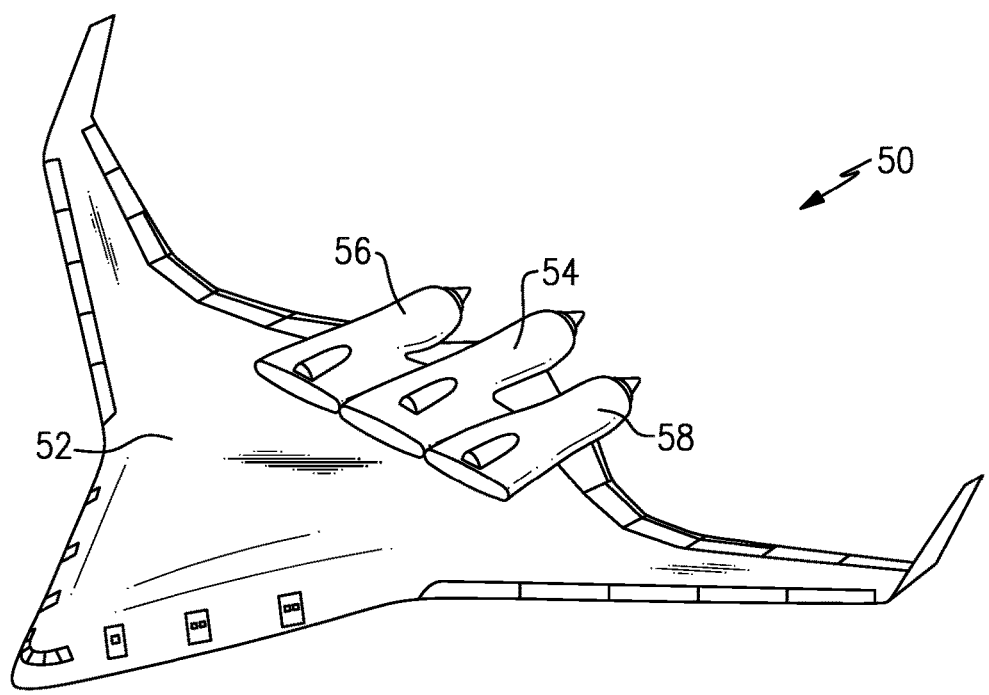
FIG. 1 schematically shows an aircraft application.

An aircraft 50 is illustrated in FIG. 1. The aircraft 50 includes a fuselage 52 that requires a unique propulsion arrangement. Thus, a gas generator engine 54 mounts distributed fans 56 and 58, which rotate about non-coaxial axes. In this manner, the propulsion for the aircraft 50 is provided in large part by the fans 56 and 58, which are driven by a single gas generator 54, but which rotate about non-coaxial axes.

Figure 2:
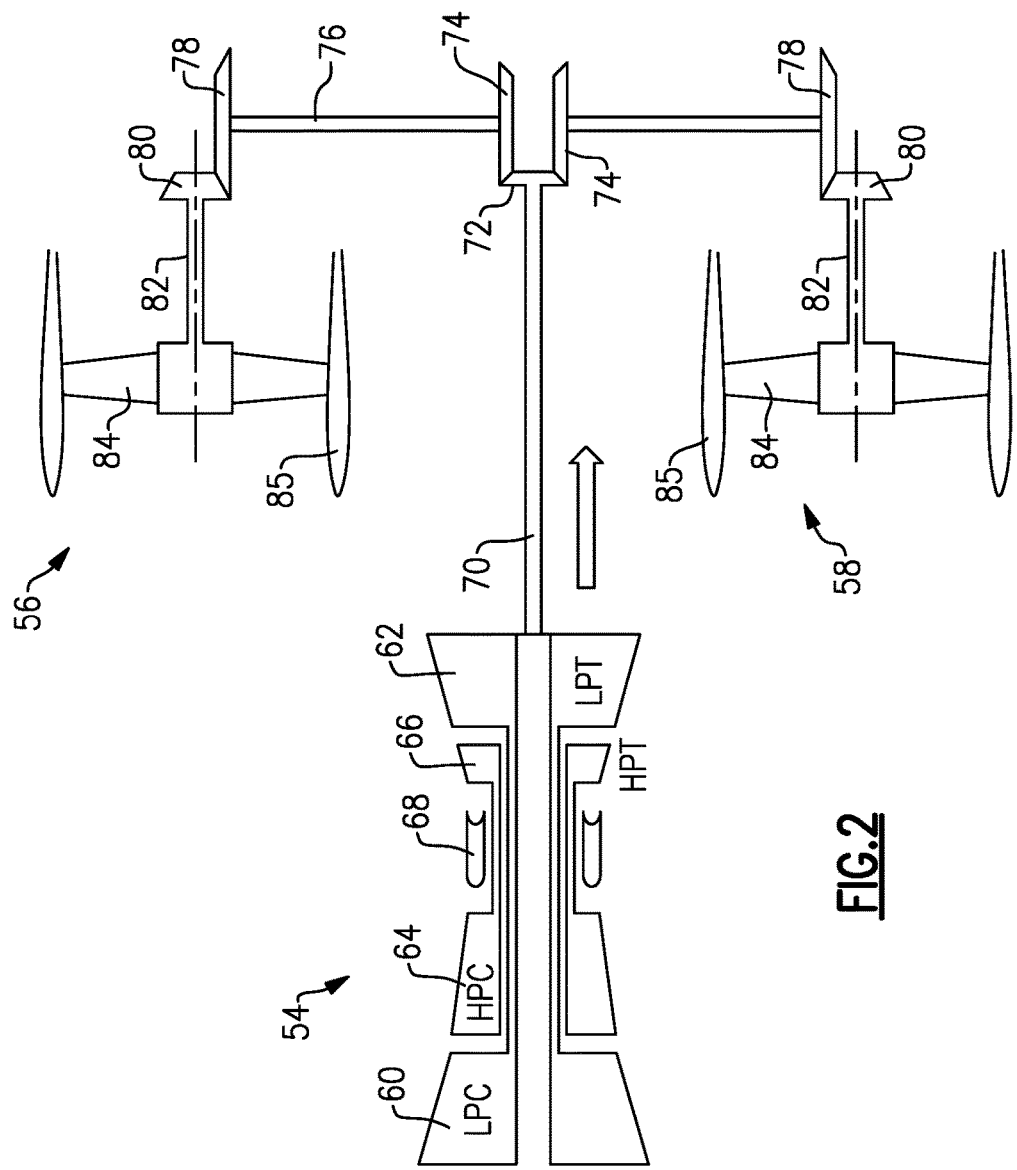
FIG. 2 schematically shows a propulsion system for the FIG. 1 aircraft.

FIG. 2 shows the propulsion system including the gas generator 54 having a low pressure compressor 60 being driven by a low pressure turbine 62. A high pressure compressor 64 is driven by a high pressure turbine 66 and a combustor 68 is placed between the compressor 64 and turbine 66. As known, air is compressed in the low pressure compressor 60, delivered into the high pressure compressor 64, mixed with fuel and ignited in the combustor 68.

Products of the combustion pass downstream driving the turbine rotors 66 and 62 to, in turn, rotate the compressors 60 and 64, as known.

In the propulsion system illustrated in FIG. 2, the low pressure turbine 62 drives a fan drive shaft 70, which drives a bevel gear 72. Bevel gear 72 drives a pair of bevel gears 74 to drive shafts 76. Each 76 drives bevel gears 78 to, in turn, drive a bevel gear 80. Bevel gear 80 drives a shaft 82 to, in turn, drive a fan rotor 84 within a fan housing 85.

Figure 3:
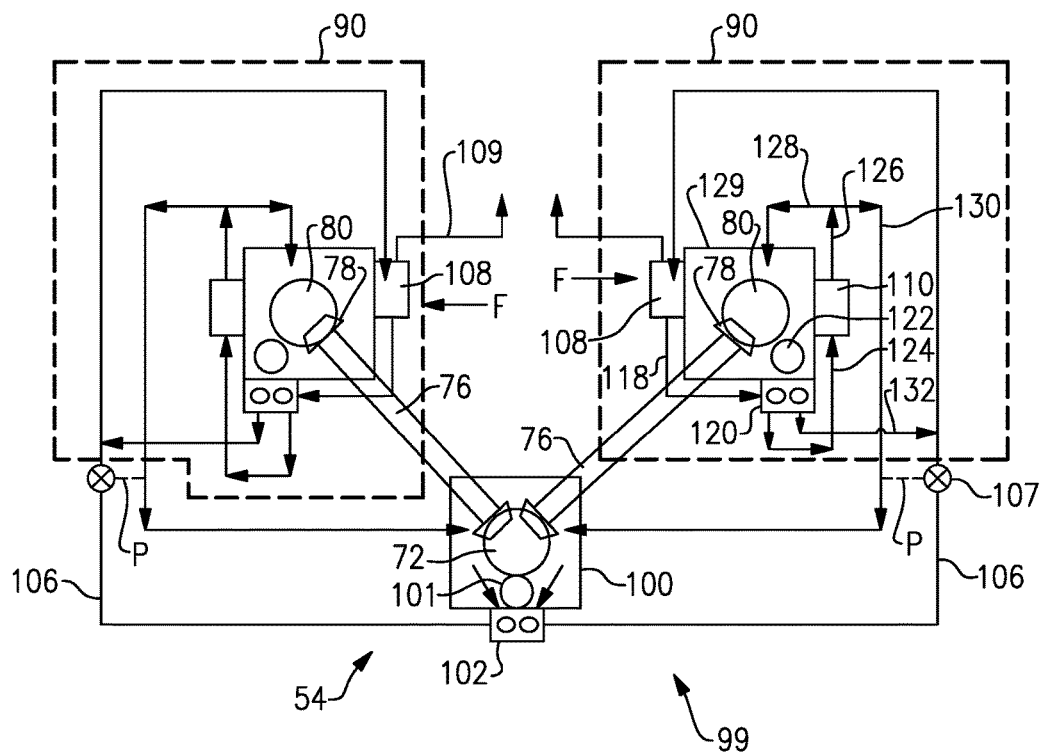
FIG. 3 shows a lubrication system.

FIG. 3 shows a lubrication system 99 for the propulsion system of FIG. 2. A housing 100 is shown surrounding the gear 72. Gear 72 is driving the shaft 76 to, in turn, drive the gears 80. However, gear 72 also drives a drive gear 101 to, in turn, drive a gear pump 102.

Gear pump 102 delivers oil through lines 106 to oil tanks 108 associated with each of the fan drive systems. The oil tank 108 also functions as a heat exchanger as fan air F passes over the oil tank to cool the oil. An air vent 109 vents air from the oil tank 108.

It is beneficial to mount the oil tank heat exchanger 108 in the area of distributed fans 56 and 58, since the air stream in this location is typically much cooler and conducive to heat transfer, whereas gas generator 54 is typically much hotter and not an ideal place to mount oil tank heat exchanger 108. This is a primary benefit for interconnecting the oil systems for the distributed fans and gas generator.

Oil from the tank 108 passes through a line 118 into a separate oil pump 120 driven by a drive gear 122, which is shown driven by gear 80. While particular gears are shown driving the oil pumps, a worker of ordinary skill in the art would recognize that other gears within this system could be the drive input to the oil pumps.

Oil from pump 120 passes to line 124 through an oil filter 110. From the oil filter 110, the oil passes into line 126 which splits between line 128 and line 130. By selecting appropriate line diameter sizes, and without the need for a control system, the flow rate can be naturally split in any proportion as desired between line 128 and 130. Line 128 will supply lubricating oil to the gears within housing 129 and line 130 will supply lubricating oil to the gears in housing 100. Valve 107 is a mechanical spring loaded check valve. When the pressure in line 130 is low, the valve will direct oil from line 106 back to line 130 and housing 100. When the pressure is high enough in line 130 under normal operating conditions, line 106 will feed oil to tank 108 as previously described. This will allow the gears in housing 100 or in housing 129 to be lubricated independently of each other by isolating each gearbox in case of mechanical failure, loss of drive or oil line rupture.

The check valve 107 ensures that oil in line 106 only passes in one of two directions. In one embodiment, pressure is sensed between lines 130 and 106 by means of a spring loaded spool similar to the mechanical valve described in U.S. Pat. No. 8,307,626 B2, the disclosure of which is incorporated by reference.

As shown, downstream of the check valve 107, each of the fan drive systems have an independent lubrication system 90.

As long as the shafts are being driven, oil will be delivered to each of the fan drive systems. Also, the oil pumps operate to deliver oil when driven in either direction such that windmilling will still result in the delivery of oil.

With this arrangement, should either of the fan drive systems fail, the valve 107 may be shut off such that oil is no longer delivered to that particular fan. The lubrication system as described will allow the gas generator and distributed fans to operate under normal conditions, when windmilling on the ground or when windmilling in the air without the need for an electronic control system or pilot manual intervention. In case of failure of one of the distributed fans, valve 107 will permit the distributed oil system to be isolated in a manner to allow continued operation of the remaining fans.

Figure 4:
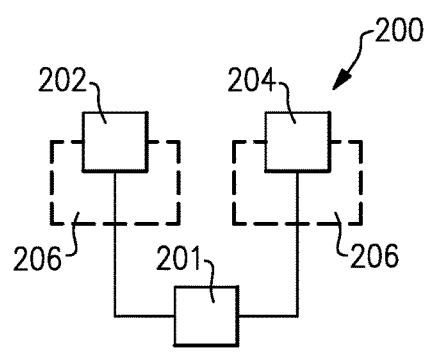
FIG. 4 shows an alternative lubrication system somewhat schematically.

FIG. 4 shows an alternative embodiment 200. In alternative embodiment 200, the oil being delivered to the fan drive systems 202 and 204 is completely independent as shown at 206. The gas generator 201 still drives the fans 202 and 204, however, the main oil system is eliminated and completely independent oil systems are provided at each fan.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propulsion system for an aircraft comprising:
   a gas generator including a turbine driving a main drive shaft, said main drive shaft, in turn, driving at least two fan drive shafts, wherein said at least two fan drive shafts are driven on non-coaxial axes, said at least two fan drive shafts each driving a fan rotor through a respective fan drive system;
   at least two fan lubrication systems each providing lubrication to said respective fan drive system;
   wherein a main lubrication system pump is driven by said gas generator and delivers lubricant to each of said at least two fan lubrication systems;
   wherein each of said at least two fan lubrication systems includes a fan drive system lubricant pump driven by a gear associated with said respective fan drive system; and
   wherein a portion of the lubricant delivered by said fan drive system lubricant pump is delivered to said respective fan drive system and a portion of the lubricant is returned to a main lubricant system.

2. The propulsion system as set forth in claim 1, wherein said at least two fan drive shafts are positioned on opposed sides of a drive axis of said turbine.

3. The propulsion system as set forth in claim 2, wherein a delivery line to said respective fan drive system has a shutoff valve such that the lubricant can be stopped to said at least two fan lubrication systems should a failure be detected.

4. The propulsion system as set forth in claim 3, wherein each of said at least two fan lubrication systems includes a fan oil tank.

5. The propulsion system as set forth in claim 4, wherein each of said at least two fan lubrication systems includes a heat exchanger and air from each of said fan rotor passing over said heat exchanger to cool the lubricant.

6. The propulsion system as set forth in claim 5, wherein a pressure sensor senses a pressure on a lubricant line associated with said respective fan drive system to detect a failure.

7. The propulsion system as set forth in claim 6, wherein each of said at least two fan lubrication systems includes an oil filter.

8. The propulsion system as set forth in claim, wherein an air vent is associated with each of said fan oil tank.

9. The propulsion system as set forth in claim 8, wherein an air vent is associated with each of said fan oil tanks.

10. The propulsion system as set forth in claim 9, wherein a pressure is sensed on a line including said portion of said lubricant being returned to said main lubricant system and said pressure being utilized to detect a failure of said respective fan drive system.

11. The propulsion system as set forth is claim 2, wherein a delivery line to said respective fan drive system has a shutoff valve such that the lubricant can be stopped to said at least two fan lubrication systems should a failure be detected.

12. The propulsion system as set forth in claim 11, wherein each of said at least two fan lubrication systems includes a fan oil tank.

13. The propulsion system as set forth in claim 12, wherein a return line returns a portion of the lubricant from said fan drive system lubricant pump back to said fan oil tank.

14. The propulsion system as set forth in claim 1, wherein said at least two fan lubrication systems are completely independent.

15. A propulsion system for an aircraft comprising:
a gas generator including a turbine driving a main drive shaft, said main drive shaft, in turn, driving at least two fan drive shafts, wherein said at least two fan drive shafts are driven on non-coaxial axes, said at least two fan drive shafts each driving a fan rotor through a respective fan drive system;
at least two fan lubrication systems each providing lubrication to said respective fan drive system;
wherein said at least two fan drive shafts are positioned on opposed sides of a drive axis of said turbine;
wherein each of said at least two fan lubrication systems includes a fan drive system lubricant pump driven by a gear associated with said respective fan drive system;
wherein each of said at least two fan lubrication systems includes a fan oil tank;
wherein a return line returns a portion of lubricant from said fan drive system lubricant pump back to said fan oil tank; and
wherein a portion of the lubricant delivered by said fan drive system lubricant pump is delivered to said respective fan drive system and a portion of the lubricant is returned to a main lubricant system.

16. A propulsion system as set forth in claim 15, wherein a pressure is sensed on a line including said portion of said lubricant being returned to said main lubricant system and said pressure being utilized to detect a failure of said respective fan drive system.

* * * * *